(12) United States Patent
Hendow

(10) Patent No.: US 7,006,765 B2
(45) Date of Patent: Feb. 28, 2006

(54) OPTICAL NETWORK MONITOR

(75) Inventor: Sami T. Hendow, Los Altos, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/967,483

(22) Filed: Oct. 18, 2004

(65) Prior Publication Data

US 2005/0078957 A1 Apr. 14, 2005

Related U.S. Application Data

(62) Division of application No. 09/720,532, filed as application No. PCT/US99/14301 on Jun. 23, 1999, now abandoned.

(60) Provisional application No. 60/090,407, filed on Jun. 23, 1998.

(51) Int. Cl.
*H04J 14/02* (2006.01)
(52) U.S. Cl. .................... 398/34; 398/7; 398/14
(58) Field of Classification Search .......... None
See application file for complete search history.

(56) References Cited

U.S. PATENT DOCUMENTS

| | | | |
|---|---|---|---|
| 4,191,473 A | 3/1980 | Hansch | 356/300 |
| 4,742,577 A | 5/1988 | Valdmanis | 370/3 |
| 5,141,609 A | 8/1992 | Sweedler et al. | 204/180.1 |
| 5,303,026 A * | 4/1994 | Strobl et al. | 356/318 |
| 5,386,115 A | 1/1995 | Freidhoff et al. | 250/281 |
| 5,406,290 A | 4/1995 | James et al. | 342/119 |
| 5,489,980 A | 2/1996 | Anthony | 356/308 |
| 5,541,756 A | 7/1996 | Chang-Hasnain et al. | 359/123 |
| 5,578,832 A | 11/1996 | Trulson et al. | 250/458.1 |
| 5,750,994 A | 5/1998 | Schlager | 250/339.11 |
| 5,751,416 A | 5/1998 | Singh et al. | 356/311 |
| 5,879,294 A * | 3/1999 | Anderson et al. | 600/310 |
| 5,930,015 A | 7/1999 | Yamamoto et al. | 359/125 |
| 6,002,990 A | 12/1999 | Hanna | 702/88 |
| 6,078,048 A | 6/2000 | Stevens et al. | 250/339.02 |
| 6,303,934 B1 | 10/2001 | Daly et al. | 250/339.02 |
| 6,519,286 B1 | 2/2003 | Porter et al. | 375/240.13 |
| 2004/0111016 A1 * | 6/2004 | Casscells et al. | 600/310 |
| 2005/0058393 A1 * | 3/2005 | Solgaard et al. | 385/18 |

* cited by examiner

*Primary Examiner*—Leslie Pascal
(74) *Attorney, Agent, or Firm*—Allen, Dyer, Doppelt, Milbrath & Gilchrist, P.A.

(57) ABSTRACT

An optical network monitor and a method for monitoring the optical signals of an optical network including a spectrograph that includes a detector array, a processor and outputs. The network monitor receives an optical input signal which includes individual channels. The optical signal is transmitted onto the spectrograph which disperses the optical signal into the individual channels. The individual channels are directed onto the detector array so that the channels are spaced across the detector array. The detector array detects the channels in parallel and transmits to the processor channel parameter data which is processes the parameter data through internal algorithms to produce the outputs.

10 Claims, 14 Drawing Sheets

OPTICAL NETWORK MONITOR

CROSS-REFERENCE TO RELATED APPLICATION

The present application is a divisional application of U.S. patent application Ser. No. 09/720,532, filed on Dec. 19, 2000 now abandoned, entitled "Optical Network Monitor", which is the national phase filing of PCT/US 99/14301, filed Jun. 23, 1999, which claims priority to U.S. Provisional Patent Application Ser. No. 60/090,407, filed on Jun. 23, 1998, the disclosures of which are incorporated herein.

BRIEF DESCRIPTION OF THE INVENTION

This invention relates generally to an optical network monitor, and more particularly to a network monitor wherein the network is a Dense Wavelength Division Multiplexing network.

BACKGROUND OF THE INVENTION

Dense Wavelength Division Multiplexing (DWDM) is the accepted solution for increasing telecommunication network capacity, while controlling overall system cost. Currently, there are several manufacturers that offer multi-wavelength WDM systems using channel rates up to 10 GB/S. Some of these systems are scalable up to 400 GB/s at 0.4 nm channel spacing.

The wavelength allocations for the systems in deployment today all follow the ITU recommendation of 193.1 THz±100 GHz. Currently, manufacturers offer a variety of channel spacing such as 200 GHz (1.6 nm), 100 GHz (0.8 nm), and 50 GHz (0.4 nm).

The high bandwidth of the optical fiber, as well as the bandwidth of erbium-doped fiber amplifiers, enable DWDM. Amplifier bandwidth is usually the flat region of 1540 to 1560 nm, or about 1525 to 1565 nm for gain-flattened amplifiers. This demand for bandwidth has further stimulated research on extended-bandwidth amplifiers, which are reported to have bandwidths of about 1530 to 1610 nm.

Most of the installed fiber network lines assume a point to point link between sites. This architecture is being rapidly extended to include add/drop capability for channel wavelengths using switches and routers that control channel destination. Such desired network flexibility requires monitoring for operation and management. For example, a change of the power of an added channel may degrade Signal to Noise Ratio (SNR) of other channels, or alternately, a rerouted wavelength may not have the needed SNR to carry traffic if injected into routes that do not have ample safety margins.

Furthermore, monitoring the status of DWDM channels has become a requirement to minimize network down time, as well as to initiate preventive measures, such as aging or drift of individual transmitters. Alternatively, environmental conditions or damage to the fiber cable may degrade some or all transmissions. Such a variety of events require the network manager to monitor all network-operating conditions simultaneously. Knowing the location and source of a fault goes a long way to minimizing repair time or the number of affected calls.

The most significant parameters that are required in channel monitoring are channel power, SNR and wavelength. Channel power and SNR are affected by the accumulation of insertion loss, polarization dependent loss (PDL), amplifier gain, and other effects, of the various in-line components in the network. Channel wavelength is driven by the transmitter's wavelength. If the wavelength drifts beyond its specifications, which are very tight for 50 GHz channel spacing, it contributes to cross talk and its failure, as well as neighboring channels.

There are other parameters that may be measured out in the field, such as cross talk and amplifier gain; however, the above three are the most important in a DWDM system. Other network requirements for optical monitoring are long operating lifetime, minimal servicing, low cost and integration into the network management system via the supervisory channel.

FIG. 1 shows a schematic of a DWDM network 110 including optical network monitors 112 for monitoring the status of all channels on the optical network 122. A transmitter node 114 transmits data at various wavelengths 116, 118 onto the optical network 122. An intermediate node or mid-node 124 may be positioned on the optical network 122 for adding or dropping data from the network 122. The network 122 terminates in a receiver node 126. It is very efficient to monitor the network at multiple nodes throughout the network to ensure accurate transmission of data. FIG. 1 shows three ONMs 112 for monitoring the network at various locations to ensure accurate initial transmission, accurate adding or dropping of data and accurate receiving of data.

There are a variety of prior art approaches to spectral analysis, particularly as applied to DWM networks. Each has its own merits and shortcomings. These prior art approaches are summarized in FIGS. 2a–d.

Rotating Grating/Fixed Detector OSA, Shown in FIG. 2a.

This configuration has a rotating grating, which allows for wide spectral range (600 nm to 1700 nm). As shown in FIG. 2a, the approach also accommodates a double-pass over the grating, which gives the signal. dynamic range of a double monochromator (−65 dB at 1550 nm) with the sensitivity of a single monochromator (−90 dBm at 1550 nm), as well as polarization insensitivity. However, moving parts, as in the direct-drive motor system for grating tuning, generally make the mechanism sensitive to vibrations and shock. In addition, an internal adsorption cell helps in wavelength calibration. The majority of units in laboratories today utilize this configuration.

Fixed Grating/Scanned Detector OSA, Shown in FIG. 2b.

In these OSAs the detector is scanned against a stationary grating. This reduces the number of moving parts, making it less prone to shock and motion; however, at the expense of a reduced wavelength range of 1525 to 1570 nm. The moving detector also slows the data acquisition and integration cycles. Typical resolution bandwidth of 0.1 to 0.5 nm, amplitude measurement accuracy of <0.8 dB and small size make it convenient for characterizing WDM networks.

Scanning Michelson Wavelength Meter, Shown in FIG. 2c.

By counting the number of fringes as one arm of a Michelson interferometer is extended, one can measure the wavelength to a very high degree of accuracy. In the case of multiple wavelengths, counting fringes is insufficient to extract their spectral profile. However, by measuring the amplitude of these fringes as the interferometer arm is extended, one can calculate the full spectrum of the input by performing a fast Fourier transform (FFT) calculation of these amplitudes.

This approach has the advantage of wide wavelength range (700 to 1650 nm) and wavelength accuracy of $10^{-2}$ to $10^{-4}$ nm for a single input wavelength, as well as 0.16 nm resolvable separation between input lines and power measuring accuracy of <1 dB for multiple input wavelengths. The response time of the instrument, however, is reduced due to the combination of a scanning mechanism, integration time and FFT analysis.

Scanning Fabry-Perot Interferometer (FPI), Shown in FIG. 2d.

An FPI is composed of two parallel and closely spaced (30 to 50 $\mu$m) mirrors, separated by a piezoelectric (PZT) spacer. By applying a voltage to the PZT, the FPI mirror separation changes, allowing light to be transmitted through it if mirror spacing is a multiple of half wavelength of the input. However, PZTs are inherently prone to drift causing these peaks to also drift. To account for drift, FPIs require an additional independent reference for wavelength calibration such as an internal absorption cell. Alternatively, an external capacitor may be added as shown in FIG. 2d for mirror spacing measurement.

This capacitive micrometry approach, in combination with a high resolution FPI, can be used to produce a compact, solid state and board mountable device, having no moving parts. The spectral transmission characteristic of FPIs has, however, a limited rejection for wavelengths adjacent to the peak, which limits the dynamic range and SNR measurements. To improve isolation better than 25 dB at 0.8 nm (with spectral range of 40 nm), the FPI requires Finesse values>350, where Finesse=spectral range/resolution, or a multi-pass configuration to improve rejection. The wavelength spectrum is developed by scanning the mirrors and averaging over the FPI spectral range.

All the technologies discussed above process channels serially with an internal wavelength scan. None of the above described systems suggest how to implement a solid state design without increasing the response time of the device or limiting the wavelength range monitored by the device, nor how to process the channels of the signal in parallel to provide simultaneous processing of the channels. A network monitor and method of monitoring an optical network implementing a solid state design which allows parallel processing of the channels of the optical signal suitable as a network element and as a network service instrument for debugging and installation has not been taught, nor has such a device been successfully commercialized.

SUMMARY OF THE INVENTION

It is an object of the present invention to provide the ability to simultaneously process optical channels dispersed from an optical signal in parallel.

It is another object of the present invention to provide a device which has a solid state design with no moving parts.

It is another object of the present invention to be suitable as a network element and as a network service instrument for debugging and installation.

It is final object of the present invention to provide fast on-board analysis and provisioning for alarm reporting.

The optical network monitor of the present invention includes a spectrograph and a method for monitoring an optical signal on an optical network. The optical network monitor includes a spectrograph which includes a detector array, a processor and generates an output representative of the signal. The network monitor receives the optical signal and transmits the signal onto the spectrograph which disperses the optical signal into individual channels. The individual channels are further directed onto the detector array such that the channels are spaced across the detector array. The detector array detects the channels in parallel and generates channel parameter data. The channel parameter data is transmitted to the processor which processes the parameter data through internal algorithms to produce the output.

The spectrograph includes a means for collimating the optical signal. The collimated signal is directed onto a means for dispersing the collimated signal into the individual channels. The individual channels are directed to a means for focusing the dispersed channels onto the detector array.

BRIEF DESCRIPTION OF THE DRAWINGS

The foregoing will be better understood from the following description when read in conjunction with the accompanying drawings in which.

DESCRIPTION OF THE PREFERRED EMBODIMENTS

The present invention is directed to providing an optical spectrometer or optical network monitor that examines the spectral content of a signal from an optical fiber and relays the information to operators of optical networks or to other interested parties. More preferably, the present invention is designed to examine the spectral content of DWDM networks. The input to the spectrometer is usually a tap off a fiber optical communication line that is carrying multiple channels, each at designated wavelengths. The output of the spectrometer includes data arrays that define the channels present and also includes measurements and calculations that are related to channel parameters.

The network monitor configuration is based on the combination of an input fiber, grating, mirrors, and a linear detector array in a solid state module that has no moving parts. This optical module is coupled to a processor card that processes the information using internal algorithms particular to the market of interest. The preferred design can be further customized to the DWDM communication market such that the spectral profile is examined for channels present in a narrow wavelength range in the telecommunication window which can include the range from approximately 1300 nm to 1600 nm. A more preferred design is for channels present in a narrow wavelength range around the 1550 nm telecommunication window, a particularly preferred design is for channels present in a narrow range 1525 to 1565 nm. The present invention can be also configured to operate with other telecommunication bands, including but not limited to, the 1565 nm to 1600 nm band, and the 1300 nm band, more preferably 1290 to 1380.

Figure 1:
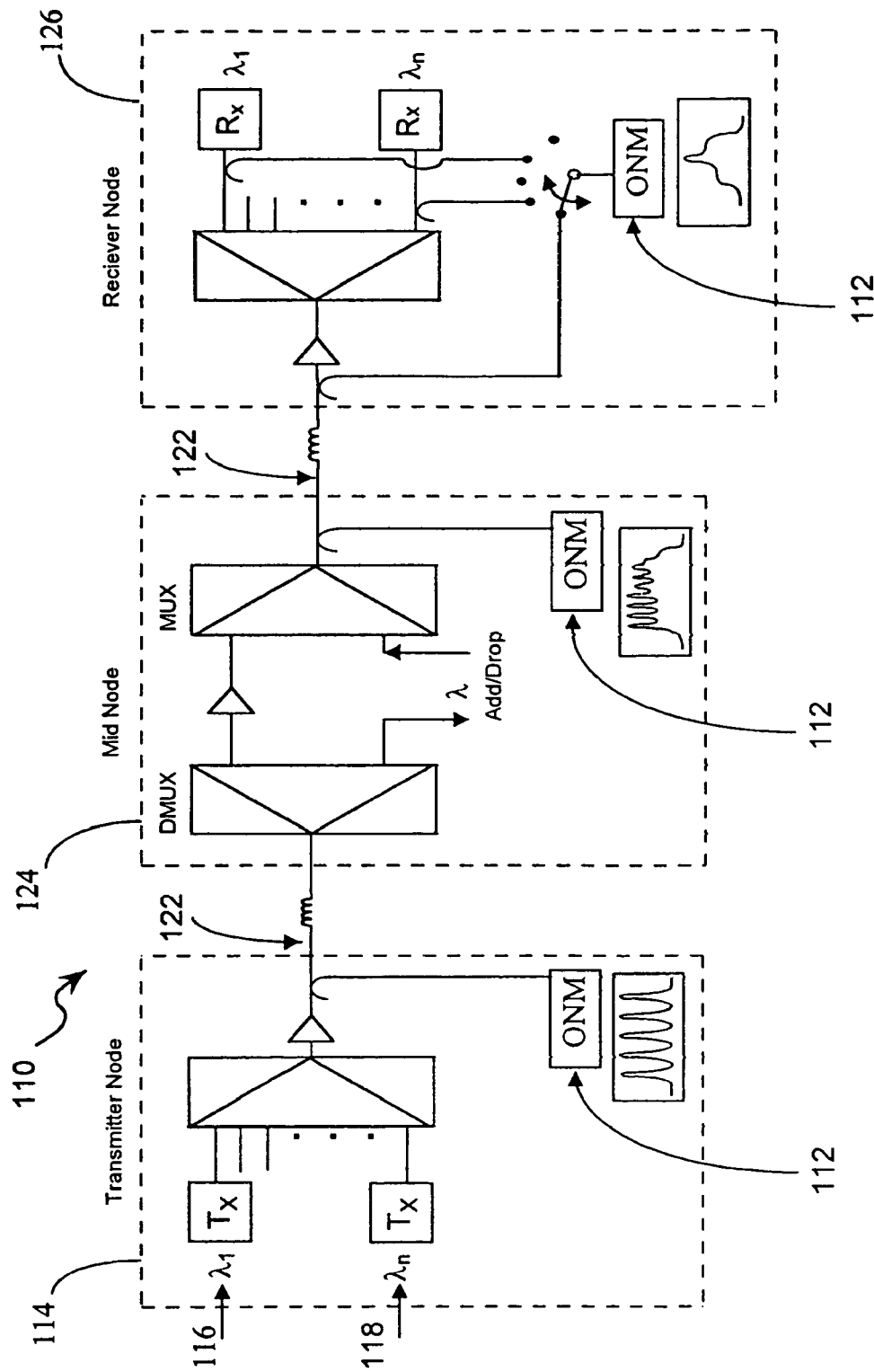
FIG. 1 is a schematic diagram of a DWDM optical network including optical network monitors.
Figure 2A:
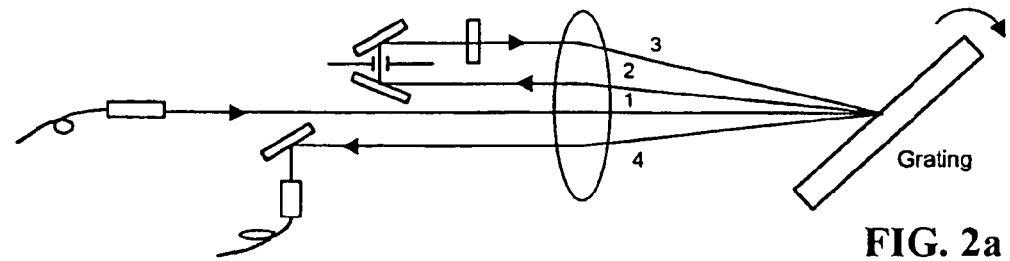
FIG. 2 is a schematic diagram of the prior art network monitors.
Figure 2B:
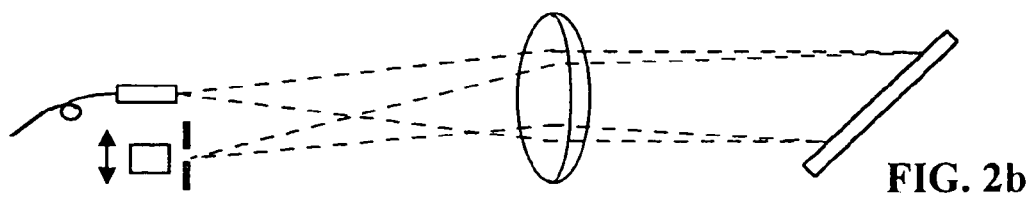
Figure 2C:
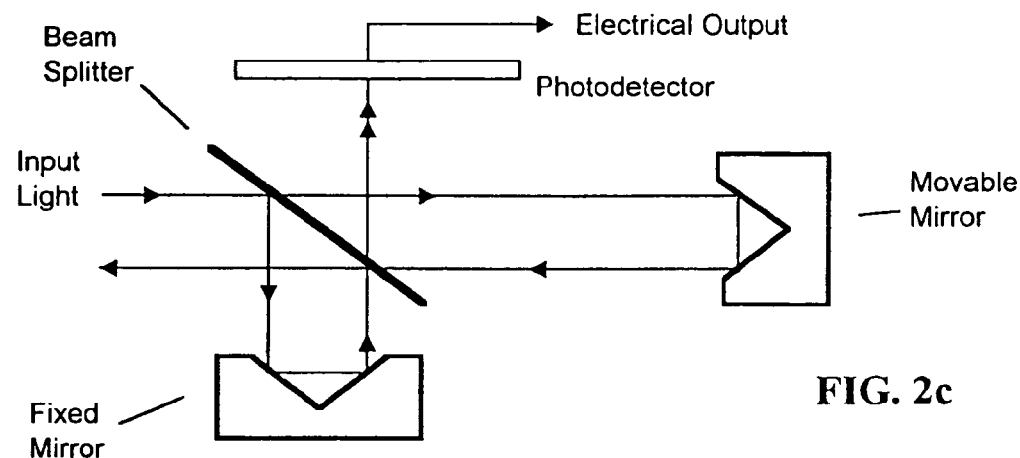
Figure 2D:
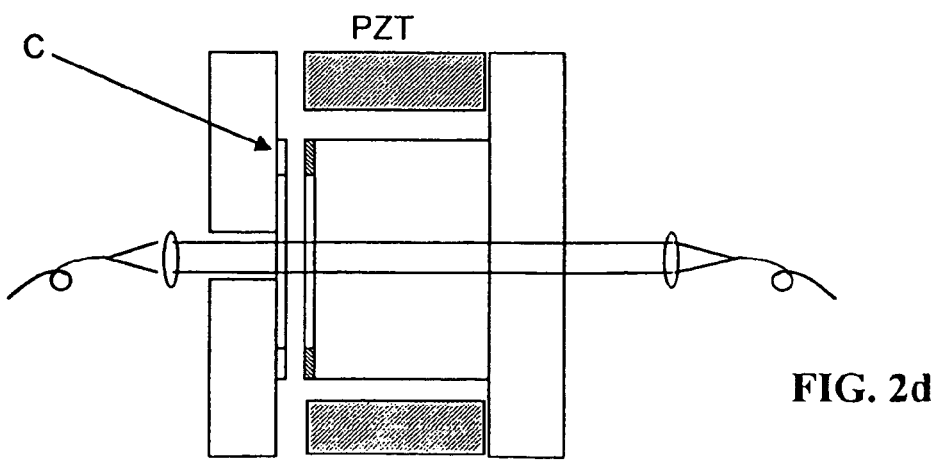
Figure 3:
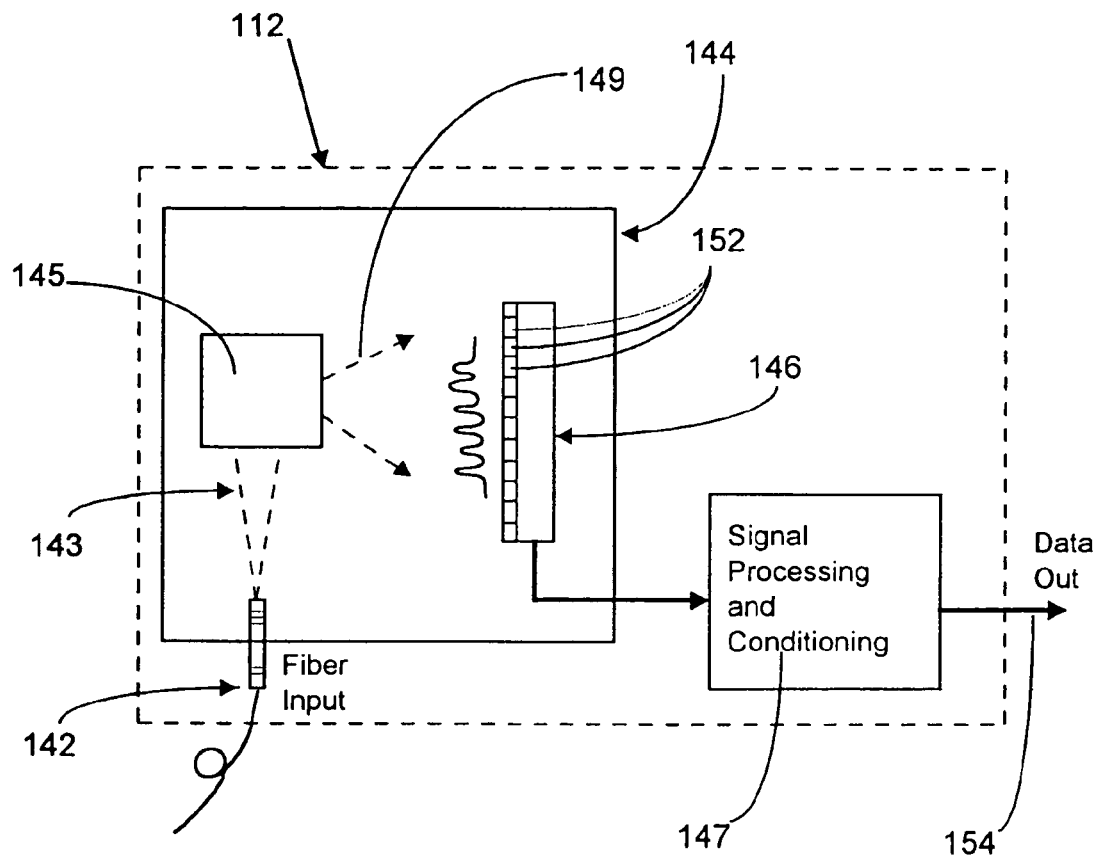
FIG. 3 is a schematic diagram of the optical network monitor including the spectrograph and the processor.

FIG. 3 shows a block diagram configuration of an optical network monitor (ONM) 112, FIG. 1, implemented in accordance with the present invention. It has an input fiber 142, which couples input signal 143 to the ONM, a spectrograph 144 including internal optical configuration 145 and a detector array 146, and a processor card 147. The internal optical configuration 145 of the spectrograph 144 separates the input signal 143 wavelengths across the detector array pixels or elements 152 of the detector array 146, such that each element 152 receives a particular wavelength of light or range of wavelengths 149. The measured power levels for the different wavelengths from the detector array 146 represent the spectral profile of the input signal 143. The power levels of wavelengths 149 are then sampled and routed to the processor card 147 that digitizes, conditions and calibrates the measurements. The processor card 147 can also report alarms if certain conditions are or are not met. The output 154 of the ONM 112 is a sequence of data points that represents the spectral profile of the input signal 143 and other information of use to the network operators. For example, the ONM 112 can supply automatic channel recognition, its wavelength, optical power and signal to noise ratio.

The current invention replaces scanning mechanisms of prior art with non-moving solid state components to generate major advantages to the communications market. The dispersion of optical channels on the detector array 146 effectively allows for parallel optical processing of all wavelengths 149 present. This speeds up data acquisition and decreases alarm latency appreciably. This also allows for instruments to be installed in the field as intermediate or mid-nodes with minimal service requirements, which enables closed-loop system operation and signal routing and decreases network down-time.

If one or several channels experience drift of their optical properties, such as power, wavelength and signal to noise ratio, the optical monitor instrument measures this change and reports it as data and/or alarm to the network operator for appropriate action.

Because the ONM of the present invention employs solid state construction, the embodiment of FIG. 3 is suitable as a deployable instrument throughout the network because it has no moving parts that may be prone to drift with shock or temperature cycling or simply wear out with age, thereby requiring periodic calibration. One of the most significant attribute of the present invention is the ability to simultaneously process optical channels in parallel, without a scanning mechanism, which speeds up data acquisition and alarm reporting considerably. In contrast, all the technologies discussed above process channels serially with an internal wavelength scan. Furthermore, the present invention is suitable as a network element and as a network service instrument for debugging and installation.

Figure 4:
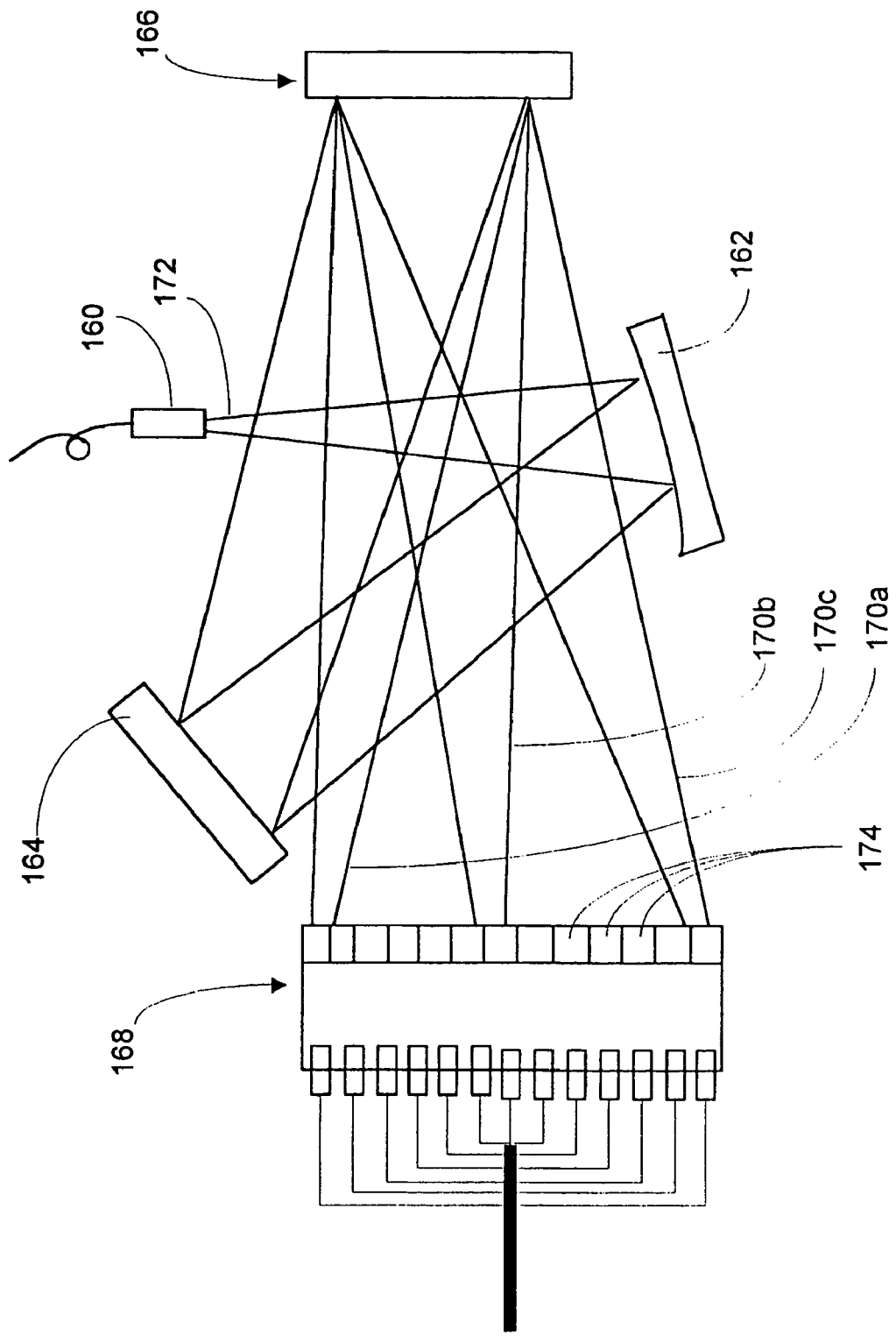
FIG. 4 is one embodiment of an enlarged schematic of the spectrograph of FIG. 3, showing the optical configuration and the linear array.

Referring to FIG. 4, there is shown one embodiment of the internal configuration of the spectrograph 144. The spectrograph 144 is composed of an input fiber 160, a first mirror 162, a second mirror 164, grating 166 and InGaAs linear detector array 168. The design is configured to produce a dispersion of channels 170 of the input light 172 of about 1530 to 1560 nm across the detector array 168. Therefore, each channel 170 is allocated a certain number of detector elements 174, where channel parameter data which can include optical power is measured simultaneously for all channels 170. In addition, the location of the peaks for each channel 170 also defines accurately the wavelength of each channel 170. SNR is simply the ratio of power intensities measured by different elements 174.

The illustrated configuration of the spectroscope in FIG. 4 can provide wavelength resolution of <0.3 nm and amplitude measuring accuracy of <1 dB. The mirrors 162, 164, grating 166 and detector array 168 are configurable so the channels 170 are linearly dispersed across the detector array 168, which allows the channel characteristics to be determined for the maximum number of channels 170. In such a configuration, the maximum number of channels 170 that can be monitored is only limited by the detector's resolution (i.e., each channel 170 must be focused on at least one detector element 174). A suitable detector that can be implemented within the present invention is an InGaAs linear detector array, manufactured by EG&G of Vaudreuil, Quebec, Canada, or Sensors Unlimited of Princeton, N.J.

Figure 5:
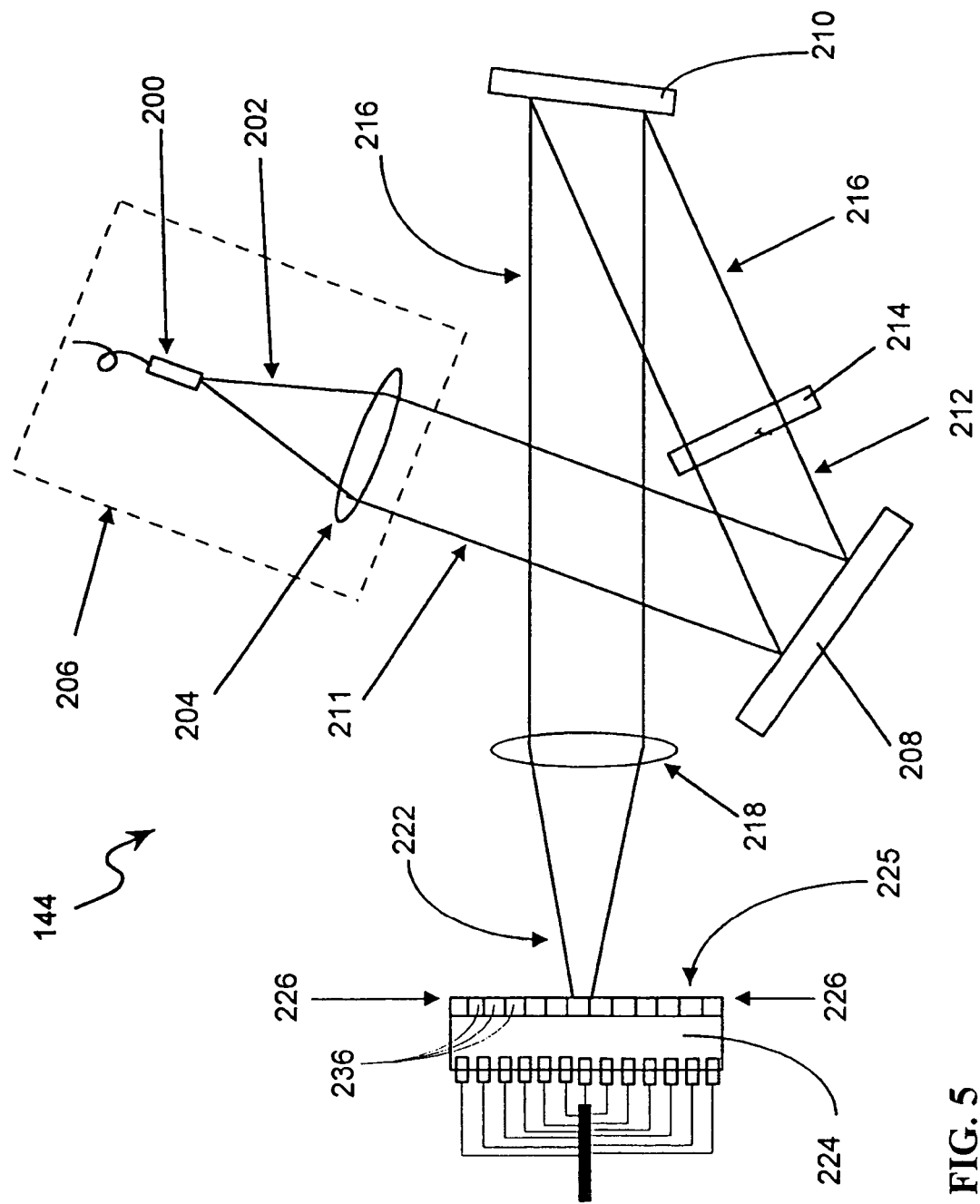
FIG. 5 is another embodiment of an enlarged schematic of the spectrograph of FIG. 3, showing the half-wave plate and the focusing lens.

FIG. 5 shows a more preferred embodiment of the spectrograph 144. The spectrograph 144 of the ONM is designed as a high resolution Optical Spectrum Analyzer (OSA). As shown in FIG. 5, the spectrograph 144 includes an input single-mode fiber 200 and collimating lens 204. The combination of the fiber 200 and the collimating lens 204 combined to form an optical collimator 206 that collimates the input signal light 202 exiting the fiber 200. The collimating lens 204 may be replaced by other optical elements that collimates a diverging beam, such as mirrors or diffractive elements. In the embodiment shown in FIG. 5, the ONM was designed to be utilized with wavelengths of the telecommunications band of approximately 1515 to 1580 nm or particularly preferred 1525 to 1565 nm, however, the design is not limited to the telecommunication bandwidth and can be adjusted to address other bandwidths of interest. The spectrograph 144 further incorporates a first grating 208 and a second grating 210 for dispersing the input signal 202 into dispersed channels. Collimated light 211 that is collimated by the collimator 206 is reflected by the first grating 208 producing a dispersed beam 212. The dispersed beam 212 passes through a half-wave plate 214, producing a polarized beam 216 that reflects off the second grating 210, producing the dispersed channels 216. The dispersed channels 216 are reflected towards a focusing lens 218. The focusing lens 218 produces a focused beam 222. The embodiment of the spectrograph shown in FIG. 5, including the grating choice and angle of incidence, produces the required dispersion and resolution that is applicable to the fiber optic telecommunications industry, which is to resolve 0.4 nm channel spacing and a wavelength band of approximately 1530 to 1560 nm. The focused beam 222 is focused onto a linear detector array 224. The present invention incorporates a liner InGaAs array 224 used for this ONM application which can include 256 elements (not shown), spaced at 50 $\mu$m, thus having a length of 12.8 mm. Other linear arrays may be used to implement the present invention without departing from the inventive aspect of the invention described. A common wavelength range of interest is 32 nm. Therefore, the dispersion of interest is approximately 2.5 nm per mm at a detector array plane 226, or 0.125 nm per element (not shown).

Other aspects of the optical design of the spectrograph 144 shown in FIG. 5 is a flat field response 225 at the detector plane 226, reduced aberrations is achieved through the reduced aberrations of the optical elements 204, 208, 210, 214, and 218. Small spot size at the detector plane compared to the width of each pixel element is achieved through reduced aberrations, as well as keeping the beam 216 large enough such that the diffraction limited spot at the detector plane 226 is also small compared to the width of each pixel element. Reduced power sensitivity along the height of each pixel is achieved by the combination of stiffening the optical assembly 145 and/or by increasing the spot size on the vertical dimension as compared with the pixel height. Stray light is reduced by adding anti-reflection coatings to the optics and by adding baffles and light masks. Compact size provides for reduced cost, weight, footprint and ease of implementation.

The half-wave plate 214 is incorporated to reduce the polarization dependent losses (PDL) for the instrument. The function of the half-wave plate 214 is to reverse the vertical and horizontal polarization states of the input signal light 202 before the second grating 210. This will equalize the combined losses of the two polarization states after reflecting off the first grating 208, passing through the plate 214 and reflecting off the second grating 210. Minimizing PDL can also be accomplished by using gratings that have similar reflectivities for the vertical and horizontal states of polarizations, such as holographic gratings with controlled emulsion depths, thereby eliminating plate 214.

Figure 6:
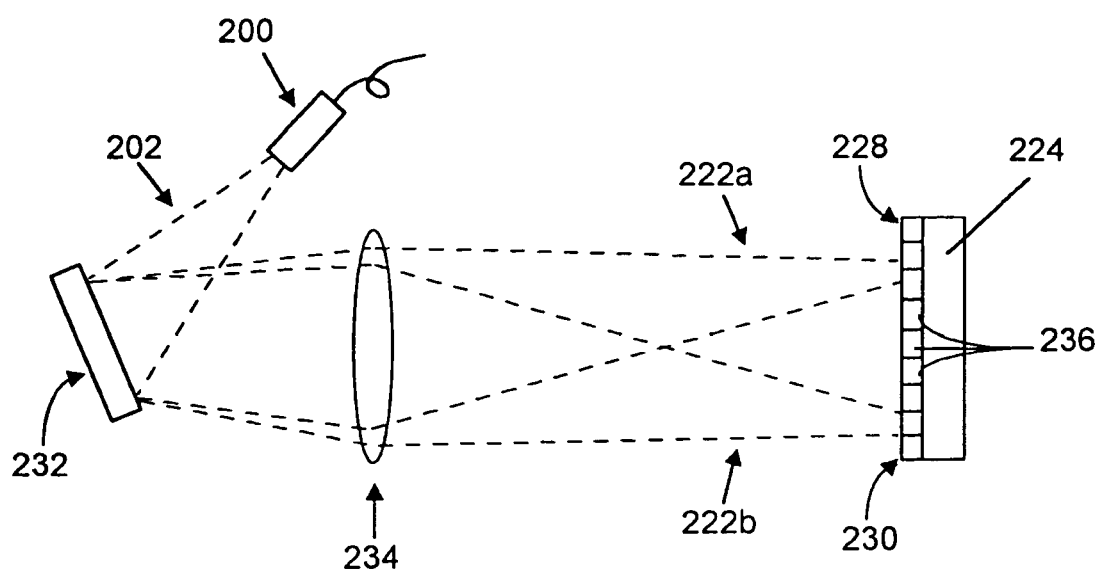
FIG. 6 is a schematic diagram of the dispersion of the optical input signal into individual channels.

The dispersed channels 216 are focused by the focusing lens 218 onto the linear detector array 224. The focusing lens 218 can be a spherical or cylindrical lens or any other optical focusing elements, such as mirrors, and may incorporate aberration corrections. As the wavelength of the input signal light 202 exiting the fiber 200 changes, the focused beam 222 moves across the elements 236 of array 224. FIG. 6 shows a representation of the input signal 202 being reflected off a grating 232, through a focusing lens 234 and dispersed across the detector array 224. An input signal 202 having a wavelength of 1528 nm would send focused beam 222a to a first end 228 of the detector array 224, while an input signal 202 having a wavelength of 1560 nm would send focused beam 222b to a second end 230 of the detector array 224.

Internal algorithms utilizing an invoked calibration process, which is described in more detail below, converts the energy received by each element 236 from the focused beam 222 to a calibrated power level that correspond to the particular wavelength of light emitted by the fiber 200.

The mechanical aspect of the spectrograph 144 design incorporates low cost modular component adjustment, stiffening agents, light baffles, stray light reduction, thermal sensitivity reduction, and compact size.

Figure 7:
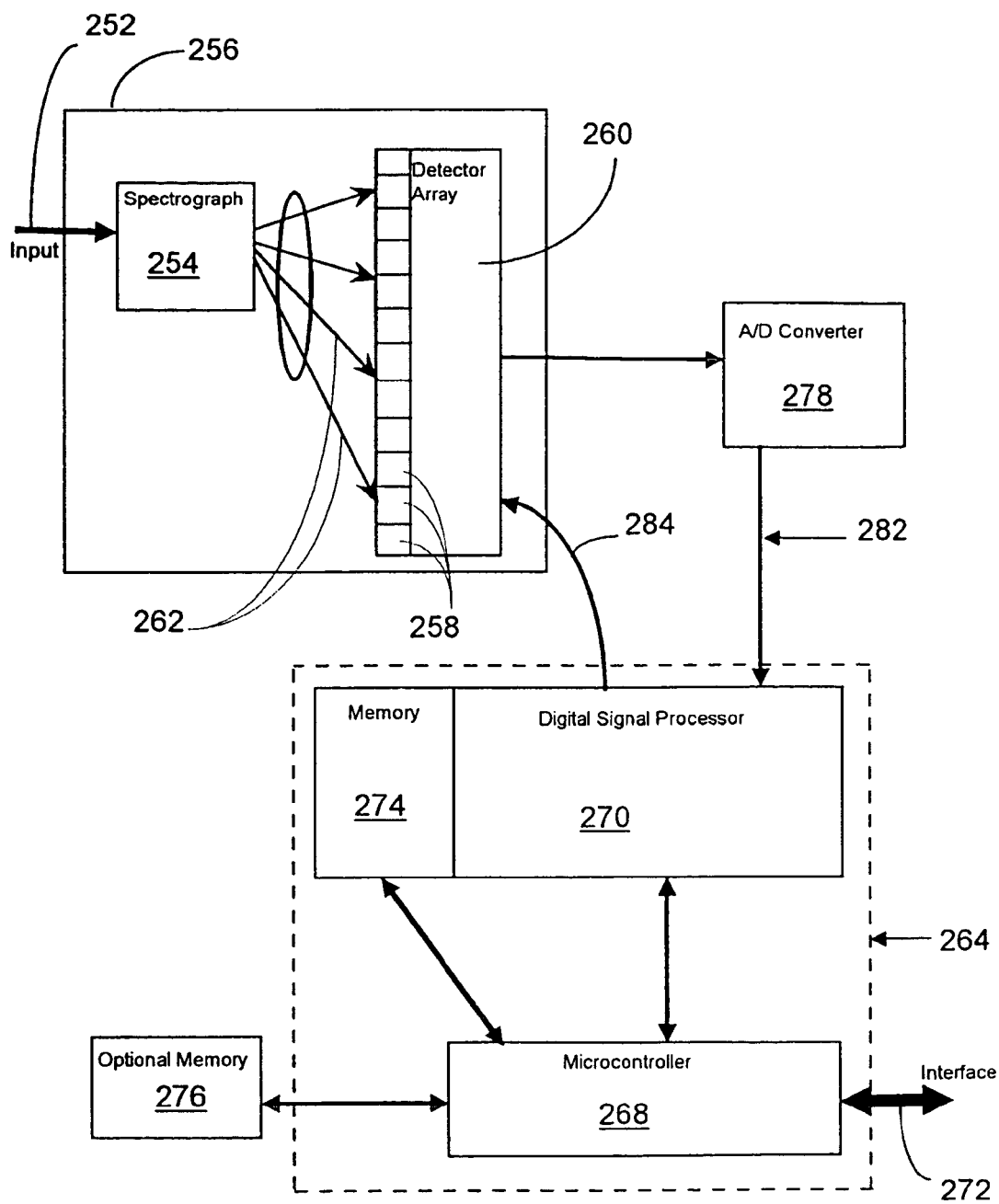
FIG. 7 is a schematic diagram of the optical network monitor including the processor.

FIG. 7 Shows a method of analyzing the data encoded within the input signal light 252 directed onto the optical configuration 254 of the spectrograph 256 and dispersed onto the elements 258 of the detector array 260 involves clocking the data out of the detector array 260 and processing it. A block diagram of this method is shown in FIG. 7. An on board microprocessor/controller 264, is coupled to the spectrograph 256, which is similar to the spectrograph depicted in FIG. 5 or 6. The microprocessor/controller 264 controls the timing and thermoelectric control (TEC) 284 of the detector array 260. The timing controls the integration time of the detector array 260 and clocking the data, while the TEC control maintains temperature regulation of the detector array 260 at a constant temperature. The TEC control enables the reduction of background noise at a range of operating temperatures.

The microprocessor/controller 264 can be a single processor or a dual microcontroller 268 and Digital Signal Processor (DSP) 270 as shown in FIG. 7. The DSP 270 is used for timing and TEC control, as well as data calibration and processing. The microcontroller 268 is used for a fast communication interface 272 to the outside world to report alarm status and measurement data. Coupled between the detector array 260 and microprocessor/controller 264 is the fast high-resolution analog to digital converter 278 that converts the analog data that is clocked out of the detector array 260 from an analog domain to digital domain and becomes the digital input data 282 to the microprocessor/controller 264. Also included within the ONM of the present invention shown in FIG. 7 is a digital signal processor memory 274, and an optional second memory 276 which is external to the microprocessor/controller 264. The DSP memory 274 is directly coupled to the DSP 270 and the optional memory 276 is coupled to the microcontroller 268. Both memories 274, and 276 are utilized during calibration and conversion of the data which is described more fully below.

Collected spectral data and alarm status information is stored in memory 274 and 276. The memory units 274 and 276 can also house the control program and internal algorithms that run the ONM which is described in more detail below. The memory 274 and 276 also store TEC control programs and any other routines that support the ONM operation and control.

Figure 8:
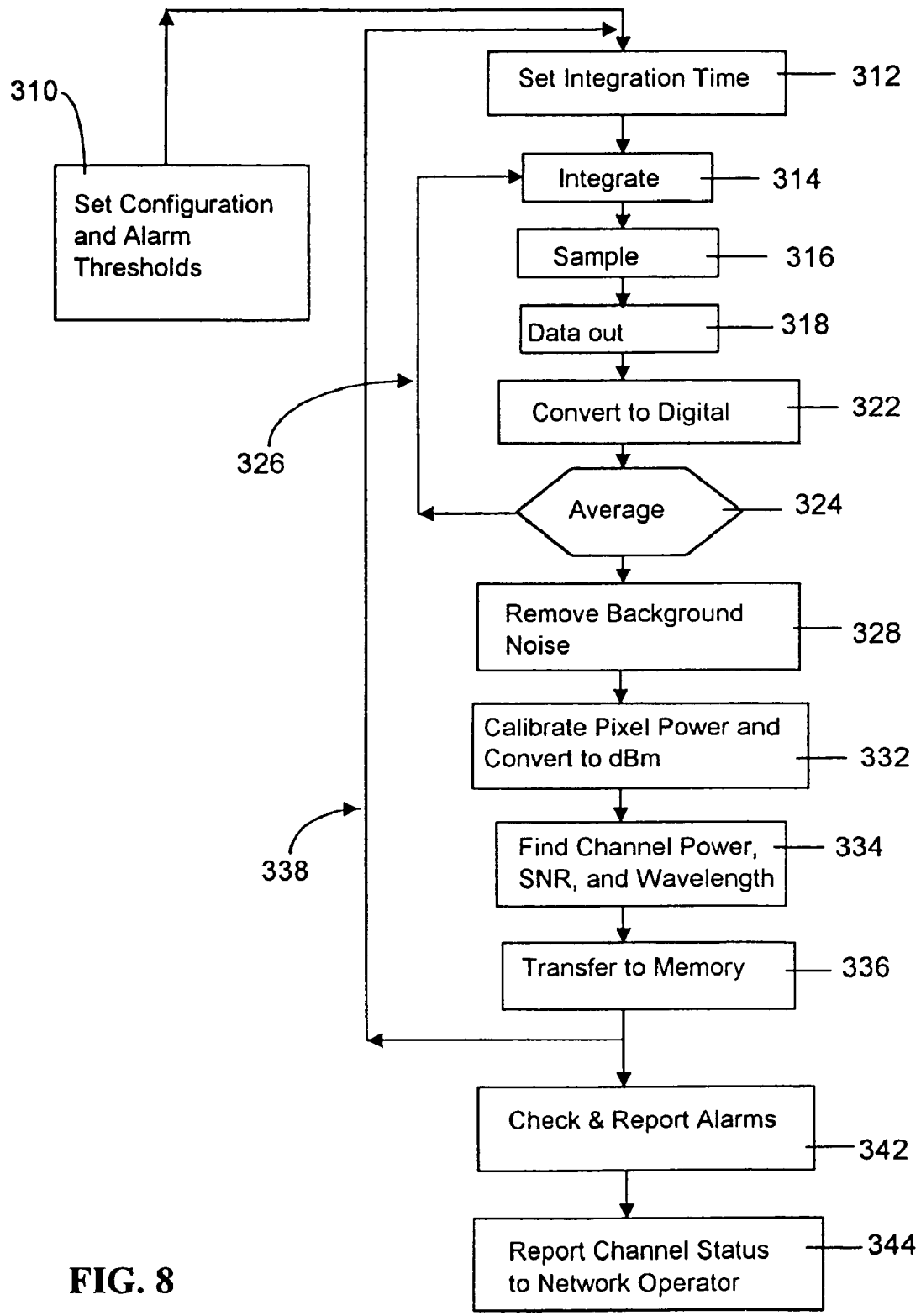
FIG. 8 is a block diagram of the conversion of element voltage into signal parameters.

FIG. 8 shows a flow-chart of the computer program or method of implementing the internal algorithms as discussed above that is utilized by the microprocessor/controller 264 to control the measurement data. The method starts by resetting the onboard electronic components and setting up default channel configuration and alarm thresholds 310. Channel configuration, as defined by the International Telecommunication Union (ITU), is typically 200, 100 or 50 GHz channel spacing. This corresponds to approximately 1.6, 0.8 or 0.4 nm channel spacing respectively.

The DSP 270 shown in FIG. 7 starts with a default array integration time 312. This integration time is later adjusted 338 to expand the dynamic range for the ONM. The DSP 270 then prompts the detector array 260 to integrate 314 the wavelengths 262 being directed onto each element 258 of the detector array 260. The DSP 270 then prompts the detector array 260 to sample 316 the element voltage and clock the data out 318 to the analog to digital converter 278, which converts it to the digital domain 322. The process of 314 to 322 is repeated more than once and averaged 324 to reduce noise fluctuations. More preferably, the process of 314 to 322 is repeated at least 10 times and particularly preferred the process is repeated at least 32 times.

The method that control the measurement data continues with the removal of dark current or the background noise 328 which is described in more detail below. The output is then calibrated 332. Several calibration tables are stored on the ONM that are used with the internal algorithms for converting the output voltage of the elements 258 to a calibrated measurement 332. Once the output is calibrated, the internal algorithms are used to calculate 334 the channel power, wavelength and signal to noise ratio (SNR):

- Array element voltage measurement is converted to power for all elements. This is performed for a set calibration aperture. Since each element is roughly 0.125 nm wide, a 0.1 nm calibration aperture is used. Other calibration apertures such as 0.2 or 0.5 nm can be used.
- Channel spacing and channel boundaries are defined.
- Find the peaks in element power levels ($A_n$).
- Channel power $P_n = A_{n-1} + A_n + A_{n+1}$, or can be the sum of powers of several elements.
- Noise Power is either the power level at the boundary or the minimum power level between two channels. Let noise at channel boundaries be $N_{n-1}$ and $N_{n+1}$ for the values at the short and long wavelength sides. Channel SNR(short)=$P_n/N_{n-1}$, and SNR(long)=$P_n/N_{n+1}$. An average SNR can also be calculated as SNR=$2P_n/(N_{n+1}+N_{n-1})$.
- Channel center wavelength is then calculated. One method of calculating the center wavelength is: Wavelength Center=(sum of (Element Power $A_m$*Center Wavelength of Element m), m=n−1, n, n+1)/(Channel Power $P_n$). Second-order correction (SOC) can be added to this equation to improve its accuracy, where SOC=$a$*delta*$(B_m - B_{m-1}/2 - B_{m+1}/2)$, a is a constant defined experimentally, delta is element spacing in nm, and $B_n$=square root $(2A_n)$. Other methods for calculating wavelength center can be employed as are know in the art.

The ONM uses this calibration table to scale the array measurements 332 and 334. The measurements are stored to memory 336 for historical evaluation. The memory used to store the measurements can include, but is not limited to, memory 274 and 276 (FIG. 7), or a memory external to the ONM (not shown). These measurements can be used for historical evaluation to compare results over prolonged periods of time, including several hours, days or even weeks. Alarm conditions are verified by calculating channel parameters 334 and comparing with stored alarm thresholds 342 for the network. A minor or major alarm is issued 342 depending on which threshold is violated. This alarm is reported via the communication ports 344. Alternately, alarm reporting and all other forms of communications may be performed via a telemetry channel or via an available Ethernet port, or through other means of communication know in the art.

Figure 9:
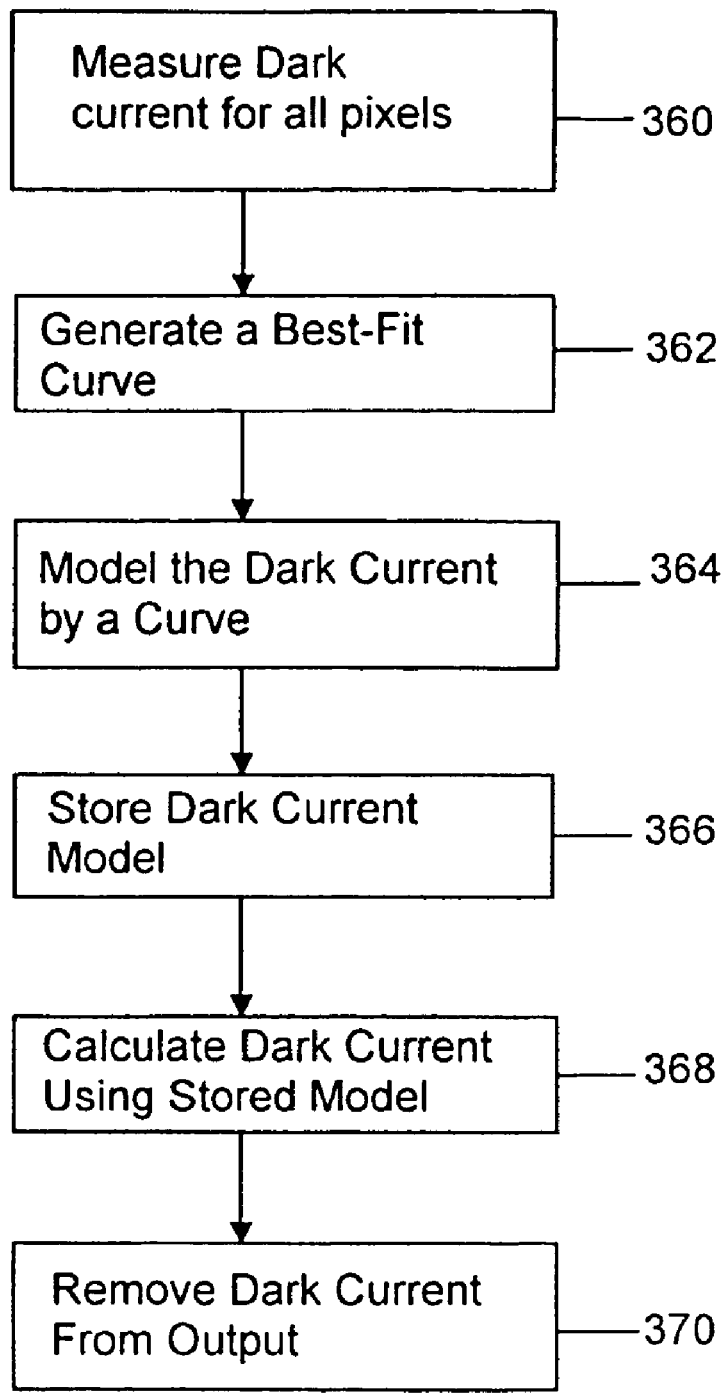
FIG. 9 is a flow diagram of the modeling of the dark current and removing the dark current from the output.
Figure 10:
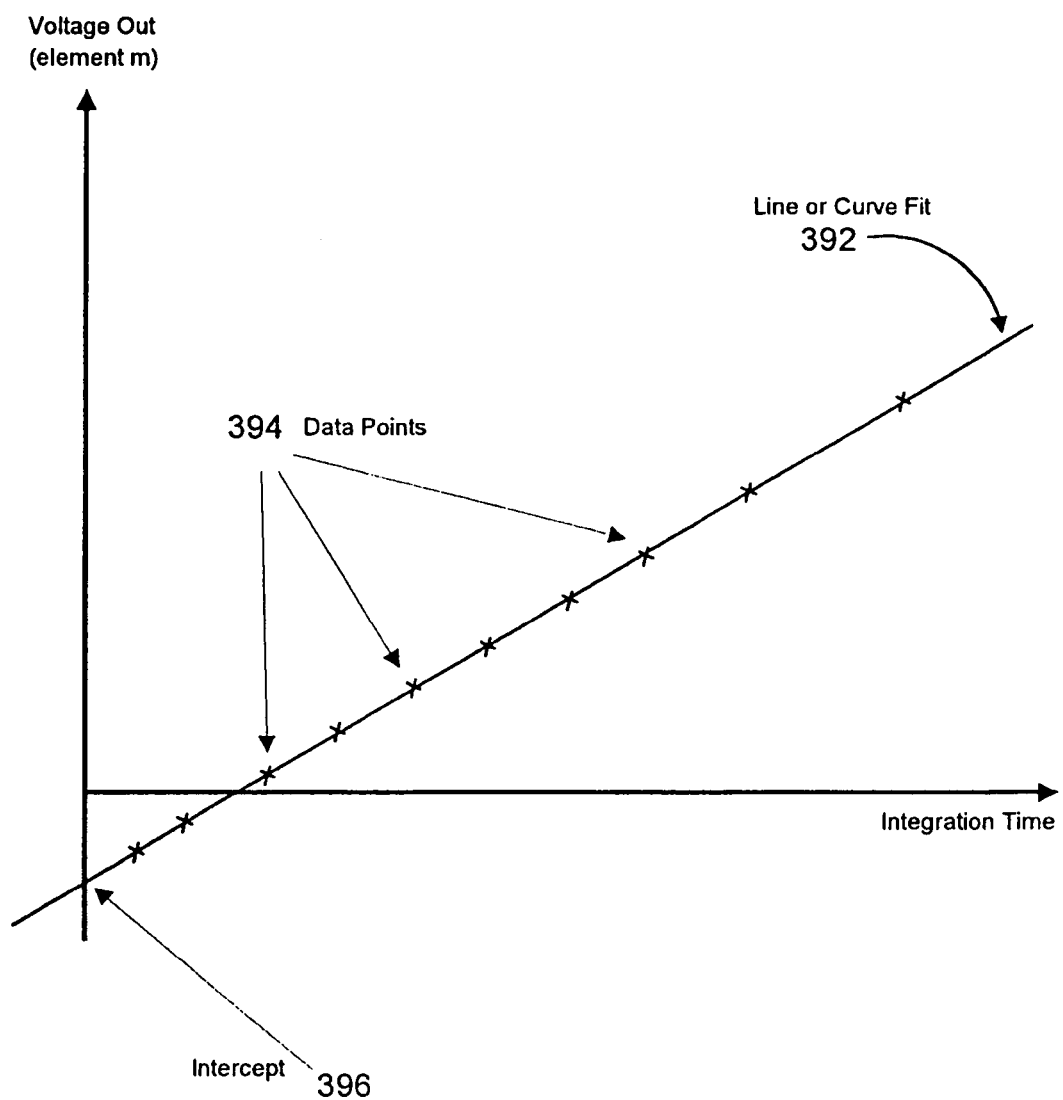
FIG. 10 is a graphical representation of the fit-curve for the dark current calibration.

FIG. 9 shows a method for modeling the dark current to be used to remove the dark current from the measurement data. First the dark current for all the elements is measured 360 for the range of integration time of interest. A best-fit curve or line is then generated 362 to match the test data for each element 258. FIG. 10 show a best-fit curve or line 392 matching the test data 394 for each element 258 and the axial intercept 396. As shown in FIG. 9, the behavior for dark current for each element 258 is then modeled by a curve or line 364 and is then saved 366 onboard the ONM for background noise reduction. For a given integration time, the dark current is calculated 368 by using the stored model 366, for example, the slope and axis intercept 396 of a straight line fit. Dark current data is then removed from the averaged output 370.

Figure 11:
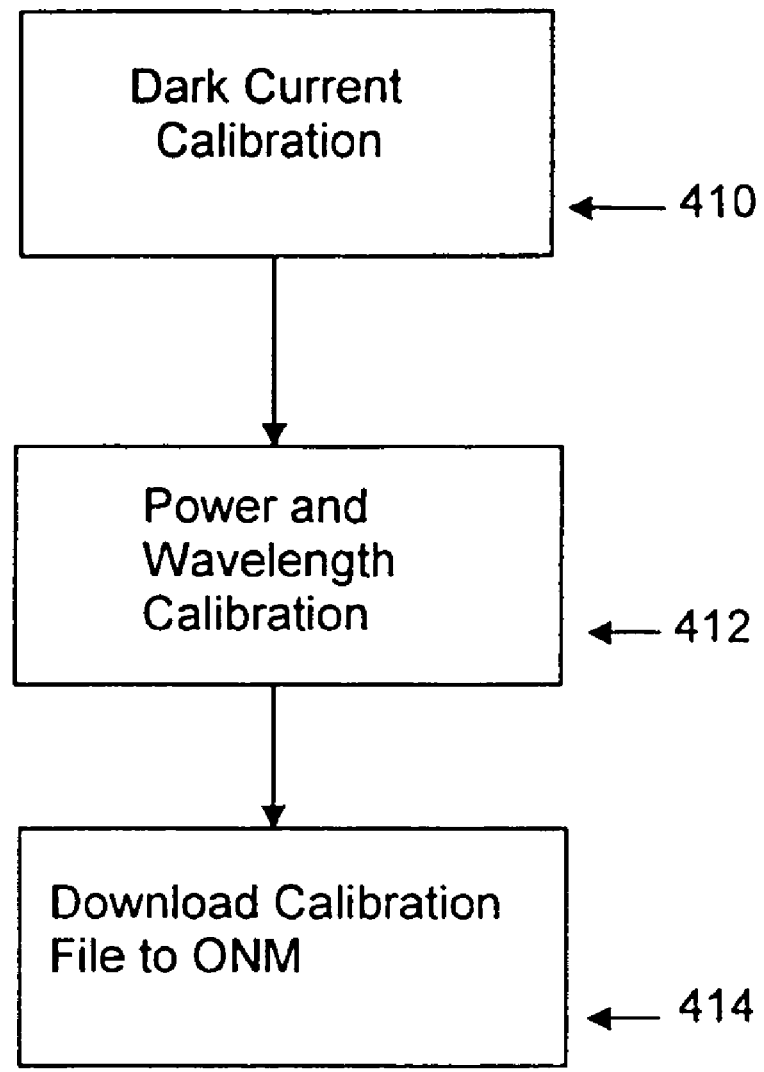
FIG. 11 is a flow diagram for the calibration method of the network monitor.

A flow chart of the calibration method is shown in FIG. 11. Dark current calibration 410, described above and shown in FIGS. 9 and 10, is performed first. The calculated parameters that model the dark current can include such parameters as slope and intercept numbers for a straight-line fit or a set of numbers for a curve fit. Optical power and wavelength calibration 412 is then generated. The dark current model, the power and the wavelength calibrations are then downloaded 414 to the ONM.

The internal algorithms utilizing the dark current calibration step 410 allows the ONM of the present invention to calculate dark current for any integration time, and to deduct that amount from the element voltage, which increases the dynamic sensitivity for the instrument significantly, as well as increases the element voltage measurement accuracy by operating within the linear measurement range. An alternative embodiment to the storage of the dark current model is to require the ONM to store large amounts of data for all possible operating integration times, or limit the integration times to only specific values.

Figure 12:
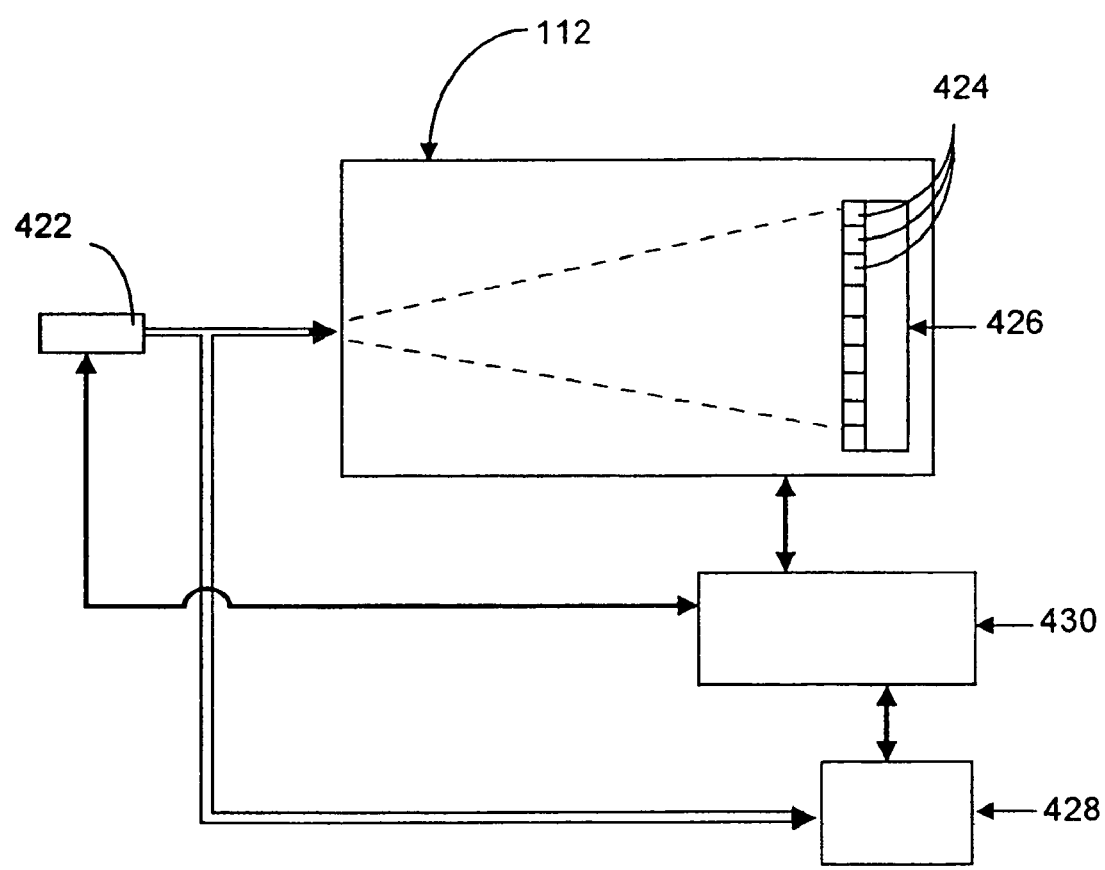
FIG. 12 is a schematic of the method of performing the power and wavelength calibration.

Optical power and wavelength calibration step 412 is then performed. FIG. 12 shows a method for accomplishing the power and wavelength calibration. A light source 422 projects light across all array elements 424 of the linear detector array 426 of the ONM 112. A comparison or calibration is performed with a reference optical and wavelength meter or optical spectrum analyzer 428 through a computer 430 or other means for performing the calibration. This calibration generates a table that maps element voltage and element sequence number to optical power and wavelength. This defines the boundaries and centers for the array elements 426, as well as the output generated for any integration time. Such a table is then downloaded 414 to the ONM.

Figure 13:
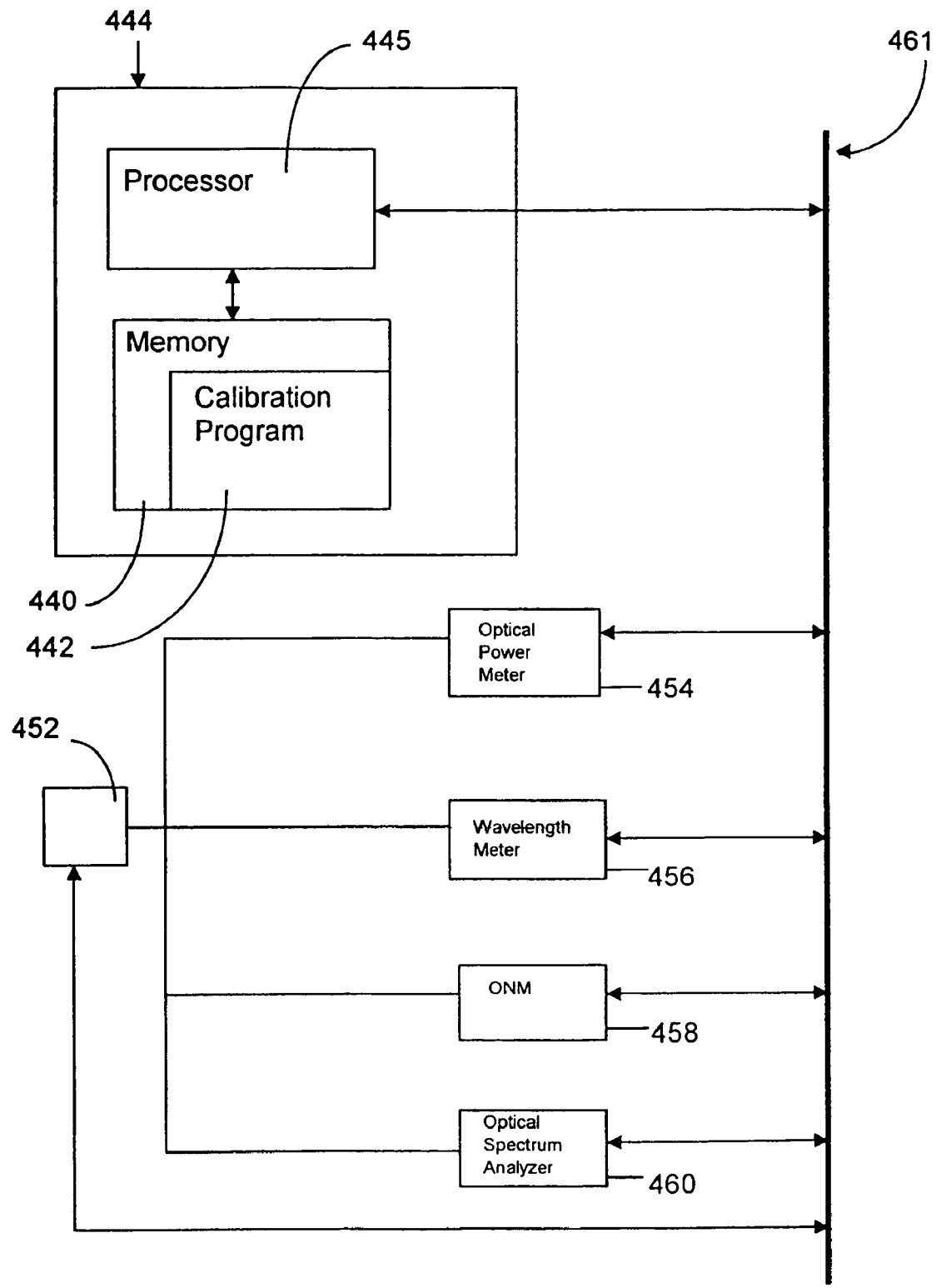
FIG. 13 is a schematic of the automation of the calibration method shown in FIGS. 11 and 12, utilizing a computer.

FIG. 13 shows a block diagram for the automation of the calibration method described above and shown in FIGS. 11 and 12, by using a computer program 442 stored in memory 440 and accessed by a processor 445 of a computer 444, and a combination of a light source 452, an ONM 456 and at least one of an optical power meter 454, a wavelength meter 456, or an optical spectrum analyzer 460 coupled to the computer 444 through a bus 461. This calibration process is typically performed whenever there is a change in array or array voltage bias, change in optical alignment or gain change of the instrument.

Figure 14:
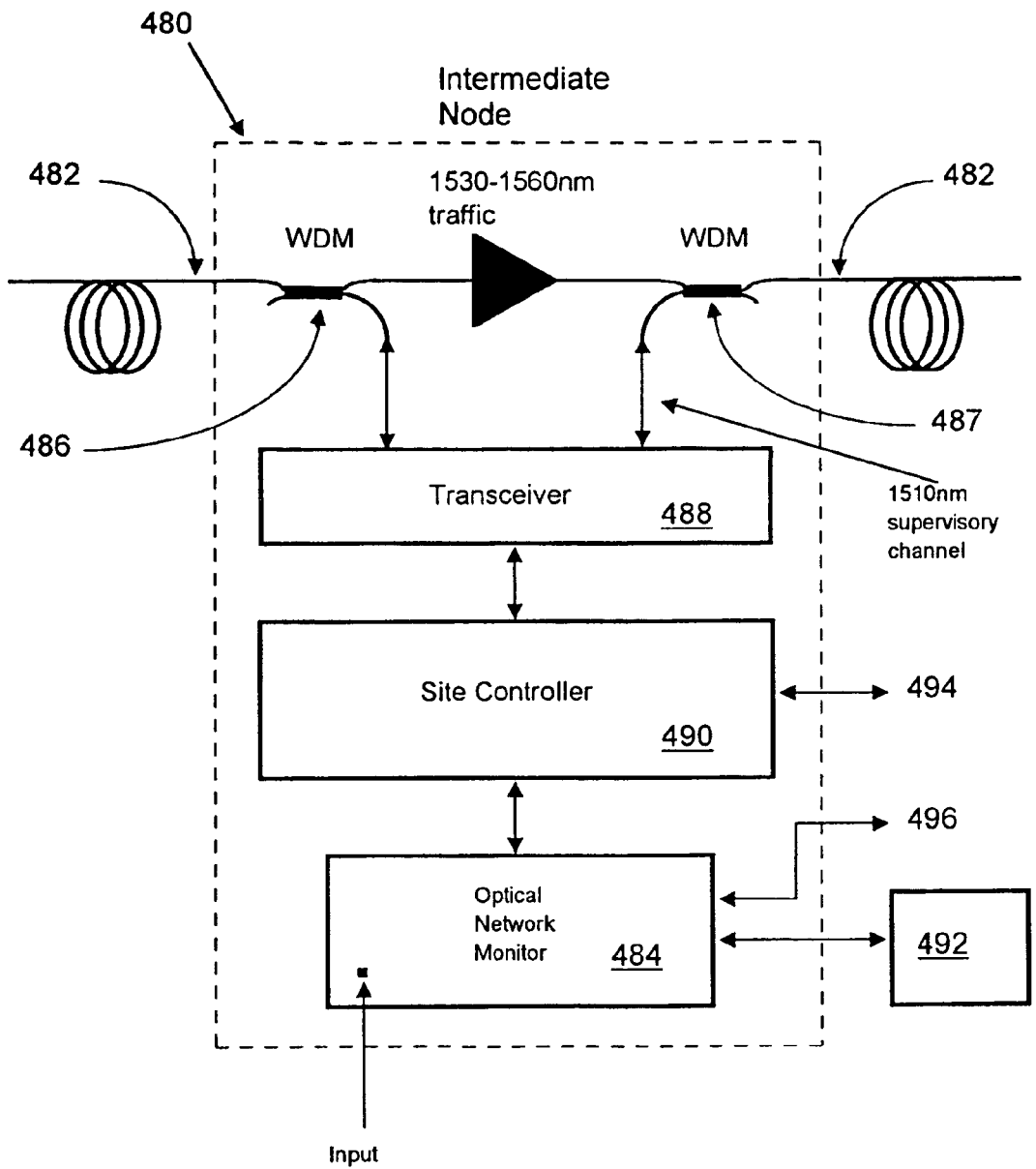
FIG. 14 is a schematic diagram of the implementation of the network monitor in an intermediate node.

Referring to FIG. 14, there is shown a block diagram of an intermediate node 480 tapped to an optical communication network 482 implementing an ONM 484 of the present invention. A first tap 486 and a second tap 487 on the network 482 are coupled to a transceiver 488 which receives or transmits optical signal onto the network 482 through the WDMs or taps 486 or 487. A site controller 490 is coupled to the transceiver and directs the transceiver 488 to received or transmit data. When the site controller 490 directs the transceiver 488 to receive data, the data is transmitted to the ONM 484 of the present invention for monitoring. The ONM 484 processes the optical signal as described above and generates an output of the optical signal's profile parameters. The transceiver 488 receives the output from the ONM 484 and communicates the output onto the network 482 to be received by a systems administrator or other interested party. The intermediate node 480 can also be coupled to a local display module 492 for viewing of the ONM output. The intermediate node 480 can be controlled from a remote location utilizing the network 482 directing the site controller 490. The intermediate node 480 can also be controlled by a direct input at the intermediate node location. In addition, an Ethernet port 494 on the site controller 490 or an Ethernet port 496 on the ONM 484 can be used to communicate data and control the intermediate node directly, without using the telemetry channel described by taps 486 and 487 and transceiver 484.

What is claimed is:

1. An optical network monitor for monitoring optical signals on an optical network, comprising:
   a spectrograph for receiving an optical input signal including individual channels, including dispersing means for dispersing the optical signal into the individual channels, and means for reducing polarization dependent losses;
   a detector array including a plurality of detector elements positioned so that the channels are spaced across the detector array, whereby the detector array detects the channels in parallel and creates a detector output signal representative of the intensity of the optical signal for each channel;
   processing means for processing the detector output signal through internal algorithms to produce an output, the internal algorithms including means for calibrating the output comprising adjustment of an element voltage through a calibration table, which includes a map of element voltage and element sequence number to optical power and wavelength.

2. The optical network monitor according to claim 1, wherein the spectrograph includes first and second gratings configured to disperse the optical signal into individual channels and onto the detector array.

3. The optical network monitor according to claim 1, wherein the processing means includes a digital signal processor and a microcontroller for accessing memory internally or externally of the processing means.

4. The optical network monitor according to claim 3, wherein the means for calibrating the output includes removal of dark current from an element voltage.

5. The optical network monitor according to claim 1, wherein the detector output signal is an element voltage sampled from at least one element of the detector array.

6. The optical network monitor according to claim 5, wherein the processing means generates an average of the element voltage by: a) integrating the wavelengths across the detector array, b) sampling the integrated wavelengths creating the element voltage, c) converting the element voltage from analog, and d) repeat steps a) to c) at least twice and averaging the element voltage.

7. The optical network monitor according to claim 2, wherein the spectrograph further comprises: means for collimating the input optical signal which produces a collimated signal for direction at the dispersing means, and means for focusing the dispersed channels across the detector array.

8. The optical network monitor according to claim 1, wherein the means for reducing polarization dependent losses includes a half-wave plate.

9. The optical network monitor according to claim 8, wherein the dispersing means includes a first and a second grating, wherein the means for reducing polarization dependent losses is positioned between the first grating and the second grating.

10. The optical network monitor as claimed in claim 1, wherein the detector output signal includes an alarm if certain predetermined conditions are met.

* * * * *